United States Patent
Krueger

(10) Patent No.: US 7,029,515 B2
(45) Date of Patent: Apr. 18, 2006

(54) METHOD OF OPTIMALLY OPERATING A PALLADIUM-COPPER ALLOY MEMBRANE IN THE GENERATION OF PURE HYDROGEN FROM A FOSSIL FUEL REFORMATE AT A CONTROLLED HIGH TEMPERATURE

(75) Inventor: Charles W. Krueger, Cambridge, MA (US)

(73) Assignee: Hy⁹ Corporation, Woburn, MA (US)

( * ) Notice: Subject to any disclaimer, the term of this patent is extended or adjusted under 35 U.S.C. 154(b) by 57 days.

(21) Appl. No.: 10/637,483

(22) Filed: Aug. 8, 2003

(65) Prior Publication Data

US 2005/0028671 A1   Feb. 10, 2005

(51) Int. Cl.
*B01D 53/22* (2006.01)
*B01D 71/02* (2006.01)

(52) U.S. Cl. ............................................. 95/56; 96/11

(58) Field of Classification Search ................ 95/55, 95/56; 96/4, 8, 10, 11
See application file for complete search history.

(56) References Cited

U.S. PATENT DOCUMENTS

| | | | | |
|---|---|---|---|---|
| 3,245,206 A | * | 4/1966 | Bonnet | 96/10 |
| 3,350,845 A | * | 11/1967 | McKinley | 95/56 |
| 3,392,510 A | * | 7/1968 | Koch, Jr. | 96/8 |
| 3,439,474 A | * | 4/1969 | McKinley | 95/56 |
| 3,791,106 A | * | 2/1974 | Haley | 96/10 |
| 4,496,373 A | * | 1/1985 | Behr et al. | 205/354 |
| 5,181,941 A | * | 1/1993 | Najjar et al. | 95/50 |
| 5,498,278 A | * | 3/1996 | Edlund | 96/11 |
| 5,997,594 A | * | 12/1999 | Edlund et al. | 48/76 |
| 6,171,712 B1 | * | 1/2001 | Thornton | 428/606 |
| 6,231,831 B1 | * | 5/2001 | Autenrieth et al. | 423/648.1 |
| 6,238,465 B1 | * | 5/2001 | Juda et al. | 96/11 |
| 6,315,820 B1 | * | 11/2001 | Saloka et al. | 96/11 |
| 6,372,363 B1 | * | 4/2002 | Krueger | 428/606 |
| 6,475,268 B1 | * | 11/2002 | Thornton | 96/11 |

* cited by examiner

*Primary Examiner*—Robert H. Spitzer
(74) *Attorney, Agent, or Firm*—Rines and Rines

(57) ABSTRACT

An optimized method of operating a palladium-copper alloy membrane in the generation of pure hydrogen from a fossil fuel reformate and the like in a controlled high temperature range of from about 470° C. to 600° C., achieving substantially constant hydrogen permeation flux flow rate over that range and without the development of leakage breaks.

8 Claims, 1 Drawing Sheet

Figure 1:
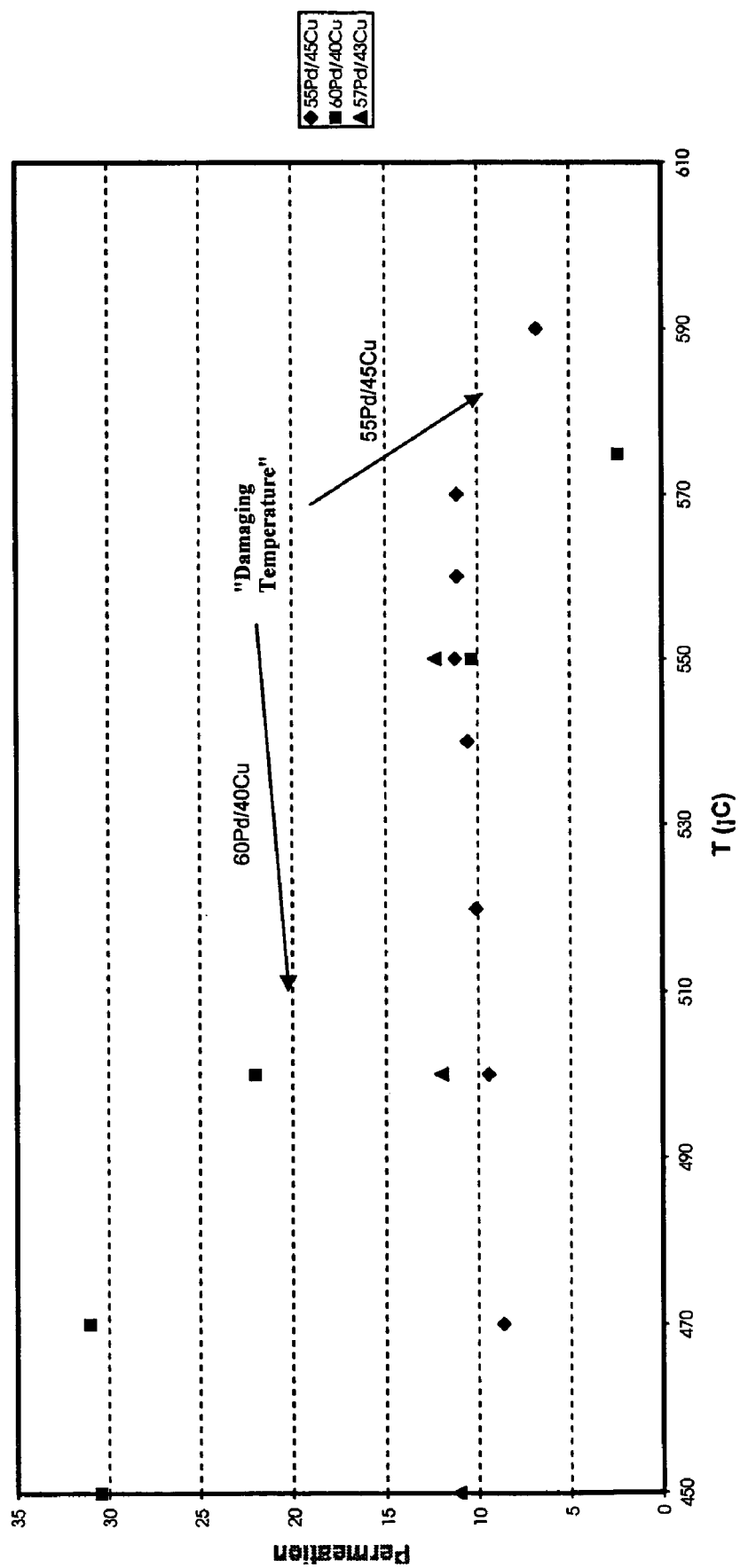

METHOD OF OPTIMALLY OPERATING A PALLADIUM-COPPER ALLOY MEMBRANE IN THE GENERATION OF PURE HYDROGEN FROM A FOSSIL FUEL REFORMATE AT A CONTROLLED HIGH TEMPERATURE

FIELD

This invention relates to palladium-copper alloy hydrogen-permeable membranes, being more particularly concerned with their optimal operation in the generation of pure-hydrogen from fossil fuel reformates in a controlled temperature range from 500° C. to 600° C., obtaining high hydrogen permeability while maintaining little or preferably substantially no impurity leakage through the membrane. The methodology involved is applicable to conducting the reforming reaction in situ with the membrane separation in a membrane reactor, maximizing both conversion of the hydrocarbon and obtaining high recovery of the product hydrogen. The method is likewise applicable to permeation of pure hydrogen from fossil fuel reformates having sulfur contamination, such as hydrogen sulfide.

BACKGROUND

By way of background, reference is made to the D. L McKinley U.S. Pat. No. 3,439,474 (1969) and U.S. Pat. No. 3,350,845 (1967) and to a publication entitled "Hydrogen permeability of Palladium-Copper membranes over a wide range of temperatures and pressures" by B. H. Howard, R. P. Killmeyer, M. V. Ciocco, B. D. Morreale, R. M. Enick and F. Bustamante, Conference proceedings of the National Hydrogen Association's 14$^{th}$ annual U.S. Hydrogen Conference in Washington D.C., March, 2003 all incorporated herein by reference. The "474" Patent relates to hydrogen diffusion barrier foils (herein also called membranes) "consisting essentially of an alloy of palladium and from about 30 to 60 weight percent copper, said alloy having a metallographic crystalline structure which is at least partially body-centered . . . ". (Col. 3, lines 41–45); and it describes in detail the advantage, for achieving the highest hydrogen permeability, of operating the alloy (Col. 6, lines 22–24), in the ordered metallographic body-centered crystalline alloy structure (also commonly called bcc) over the face-centered crystalline structure (also commonly called fcc). The above referenced Howard publication further verifies the speculations put forth in the McKinley "474" patent, and additionally states, applicable references in parentheses, that "Pd—Cu alloys have exhibited resistance to sulfur poisoning upon exposure to H$_2$-rich retentate streams containing H$_2$S levels of up to 5 ppm [9]., 1000 ppm [10] and (at temperatures greater than 773K) intermittent exposure to 10,000 ppm [7]." (Page 2, 1$^{st}$ paragraph, next-to-last sentence).

Accordingly, the alloys of the present invention, later described, when limited to operate at a controlled temperature in the preferred range from about 500° C. (773K) to 600° C., are resistant to sulfur-contaminated fossil fuel reformates, including, but not limited to, steam reformed or partially oxidized diesel fuel or partially oxidized or gasified coal.

The simultaneous permeation of pure hydrogen through palladium alloy (including Pd/Cu) membranes during steam reforming of fossil fuels, including hydrocarbons, has the advantage of simultaneously producing high purity hydrogen in a single reaction step. Further, in contrast to conventional reforming at higher temperatures of the order of about 800° C., a more moderate reforming high temperature of 500° C. to 600° C. actually suffices in the important cases of simultaneously reacting steam with a hydrocarbon and permeating pure hydrogen therefrom through a palladium copper alloy membrane.

I have found that during my testing of palladium copper alloy membranes in the selected temperature range from about 500° C. to 600° C.—particularly those alloys later described for the purposes of the present invention—, that leakage through the membranes rapidly occurs which is apparently induced by the high temperature. More specifically and as outlined in the examples below, I have found that the commonly employed 60 weight % Pd/40 weight % Cu alloy (herein 60Pd/40Cu) can only be reliably operated to a maximum temperature in the range from 450° C.–500° C., but that above those temperatures, leakage to impurities rapidly develops and increases in magnitude as the membrane is cycled between the safe temperature range below about 500° C. and this newly determined damaging temperature range above 500° C. Thus it follows, for example, that in order to maintain the 60Pd/40Cu membrane leak free, it must be maintained at a temperature below about 500° C. and preferably at or below about 450° C.

Under the presumption that the observed temperature induced leakage breakage occurs due to the phase change of the 60Pd/40Cu alloy from the fully bcc phase to a full or partial fcc phase, further experiments were undertaken with different Pd/Cu alloy compositions which the above referenced "474" patent teaches to maintain a bcc phase at higher temperatures than the 60Pd/40Cu alloy of the prior art. It was thus determined that Pd/Cu alloys with slightly higher than 40 weight percent of copper not only exhibited higher damaging temperatures (said temperature which depends on the exact alloy composition) as speculated, but that, in a very critical range of composition and operating temperature range, the alloys of the present invention exhibit higher hydrogen permeability than the 60Pd/40Cu alloy. Thus I have discovered a superior group of Pd/Cu alloys when compared to the 60Pd/40Cu, specifically with a critical composition of 54–58 weight % Pd with the balance substantially Cu. This group of alloy compositions can be safely operated in a temperature range between about 500° C. and about 600° C. (depending on the exact alloy) without leakage breakage and in the range from above about 550° C. to about 600° C. wherein the alloy maintains a higher hydrogen permeability rate than the prior art 60Pd/40Cu alloy which itself develops leakage breakage over this range of temperatures. This finding is surprising in the view of the prior teaching in the McKinley "474" patent showing the 60Pd/40Cu alloy as having the highest permeability amongst the family of Pd/Cu alloys in the 30–60 weight percent copper range at 350° C.

In accordance with the discoveries underlying the present invention, it is thus found that palladium-copper alloy membranes can be maintained leak-free by carefully controlling the temperature that the membrane is subjected to during operation to a composition dependent value between about 500° C. and 600° C. The exact maximum "damaging" temperature, moreover, is dependent on the specific alloy composition in question, and generally occurs at some point in the region where hydrogen permeation decreases with increasing temperature as shown in FIG. 1. Such damaging temperatures can be pre-determined by thermal cycling and intermittent measurement of inert gas (such as helium or argon) permeation rates, by following procedures described in the examples below. It is further found that there exist slightly but critically different Pd/Cu alloys that remarkably achieve substantially constant hydrogen flux permeability at fluctuating temperatures over the 470° C. to almost 600° C.

temperature range, instead of the rapidly declining hydrogen flux permeability characteristic of McKinley's 60Pd/40Cu alloy above 450–470° C.—and that they achieve such constant permeability irrespective of temperature use in such a range without suffering the gradually increasing leak of impurities into the permeated hydrogen of the prior art ratio alloys in fossil fuel reformate generation of pure hydrogen, as the temperature is increased or decreased within such range.

The invention is primarily directed to this novel performance over prior art recommended 60Pd/40Cu alloys, as will later be detailed.

OBJECTS OF INVENTION

It is therefore a principal object of the present invention to provide a new and improved method of optimally operating critical weight percentage ratio Pd/Cu alloy membranes in the generation of pure hydrogen, as from a fossil fuel reformate, at controlled high temperatures, fluctuating in about the 470° C. to 600° C. range.

A further object is to provide such optimal operation wherein the hydrogen flux permeability remains substantially constant over such temperature range and is not subject to the rapid flux decline over prior art Pd/Cu alloy ratios.

Still another object is to provide a novel critical weight percentage alloy Pd/Cu ratio membrane that specifically enables the optimal operating method of the invention and over said temperature range, and additionally maintains the membrane leak free throughout said range.

Other and further object will be explained hereinafter and are more particularly delineated in the appended claims.

SUMMARY

In summary, however, from one of its important aspects, the invention embraces a method of controlling a palladium-copper alloy membrane in the generation of pure hydrogen from a fossil fuel reformate, that comprises, permeating hydrogen from the reformate through a palladium-copper alloy of composition adjusted to be of substantially 54 to 58 weight percentage of palladium and 46 to 42 weight percentage of copper, respectively; and controlling the temperature to which the membrane is subjected during said permeation to operation in the range of from about 470° C. to about 600° C., wherein substantially constant hydrogen flux is permeated by the membrane over said temperature range and without leakage breakage.

Preferred and best mode embodiments and designs are later presented in detail.

DRAWINGS

The invention will now be described in connection with the accompanying drawing—a FIG. 1 graph comprising the constant hydrogen flux permeability results of the invention and its leak damage-free performance with the prior art Pd/Cu membrane operation in the desired about 450° C. to 600° C. temperature range.

DESCRIPTION OF PREFERRED EMBODIMENT OF INVENTION

As before explained, the prior art recommended 60 wt % Pd/40 wt % Cu alloy of McKinley, while showing high hydrogen permeability to hydrogen at 350° C. and increasing permeation with increasing temperature up to a range between 400° C. and 450° C., has been found to suffer a rather rapid decline in permeation at higher temperatures—particularly steep decline as shown in the "60Pd/40Cu" curve [rectangular plots] in the graph of FIG. 1 in the range from 450° C. to 570° C. The "Damaging Temperature" arrows indicate a region of temperature above where serious leaking damage has been encountered with membranes of this alloy in this temperature range.

By slightly, but critically, varying of the Pd/Cu weight percentage ratio from the before-mentioned prior art from 60Pd/40Cu to the range of about 58–54Pd/42–46Cu, the remarkable results of the invention are obtained—where, instead of the steep fall in hydrogen flux permeation of the 60Pd/40Cu prior art alloy, substantially constant and slightly increasing hydrogen flux permeation is achieved over the about 450° C. to about 570° C. temperature range of optimal operation as shown by the "57Pd/43Cu (triangle plots) and the 55Pd/45Cu (diamond plots)". It should also be observed that at temperatures above the "cross over" points of the 60Pd/40Cu curve with the 55Pd/45Cu curve, the latter exhibits higher hydrogen permeability than the prior art alloy.

The following examples describe tests that proved the novel operational results above described.

Example 1

A 55 wt % Pd/45 wt % Cu membrane 25 microns thick with 0.38 cm² active area was mounted in a membrane test cell with an aluminum oxide porous fabric support directly in contact with the permeate side of the membrane. The hydrogen permeation at 450° C. and a 100 psig upstream hydrogen pressure permeating to ambient was 4.9 cc/min. At 550° C., the permeation rate at the same hydrogen pressure condition was 6.7 cc/min. The membrane remained leak tight to nitrogen permeation at a pressure condition of 100 psig nitrogen.

A control sample membrane of the prior art 60 wt % Pd/40 wt % Cu 25 microns thick was tested in the same test cell. At 450° C., the permeation was determined, under a 50 psig hydrogen partial pressure permeating to ambient, to be equal to 11.9 cc/min. Although not measured, the corresponding calculated hydrogen permeation at 100 psig permeating to ambient is expected to be about 19.5 cc/min. At 500° C., the hydrogen permeability at the same pressure condition was found to be equal to 8.3 cc/min, corresponding to a permeation rate at 100 psig of 13.6 cc/min. At 550° C., the hydrogen permeability was found to be 3.9 cc/min, corresponding to a 100 psig value of 6.4 cc/min or just slightly below the value for the 55Pd/45Cu alloy above. After the excursion to 550° C. (where it was held for 24 hours), the nitrogen permeability through the 60/40 Pd/Cu alloy was measured at 450° C. to be 1.6 cc/min at with an applied 100 psig nitrogen pressure differential.

This example thus illustrates two membranes with more or less equal flux at 550° C., but the optimal membrane being determined to be the 55 wt % Pd/45 wt % Cu due to the better leak performance at this temperature.

Example 2

By way of a second example, a defect free 25 micron thick 60 wt % Pd/40 wt % Cu membrane was subjected to thermal cycling tests while under a pure hydrogen atmosphere permeating from 50 psig to ambient pressure. The membrane area was 0.38 cm² and was supported by a layer of porous aluminum oxide material. The thermal cycles were conducted by rapidly raising the membrane from 450° C. to 600° C. in about 10 minutes time, holding the membrane at 600° C. for several minutes and then rapidly cooling the membrane back to 450° C. over about 5 minutes time. The hydrogen permeation was occasionally measured at 600° C. and generally was very low, 1.7 cc/min, verifying a transition into the fully fcc phase regime. Immediately after each cycle, the membrane was thoroughly purged on both sides with nitrogen and then subjected to a 100 psi differential pure nitrogen pressure and the nitrogen permeability rate was measured. After the nitrogen permeability was measured, the membrane was returned to a permeating condition on pure hydrogen and the test repeated. The following table shows the results of these thermal cycles:

TABLE 1

| (#) Cycle | 100 psig/0 psig $N_2$ permeation (scc/min) |
| --- | --- |
| (1) 450° C.–600° C.–450° C. | 0.37 |
| (2) 450° C.–600° C.–450° C. | 0.67 |
| (3) 450° C.–600° C.–450° C. | 0.86 |
| (4) 450° C.–600° C.–450° C. | 1.1 |
| (5) 450° C.–600° C.–450° C. | 1.8 |
| (6) 450° C.–600° C.–450° C. | 2.9 |
| (7) 450° C.–600° C.–450° C. | 2.8 |

Thus repeated thermal cycling into damaging temperature regimes was illustrated to lead to a progressively higher and higher leak rate.

This invention thus provides a method for separating hydrogen from a gas mixture containing hydrogen in a temperature range between, say about 500 to 600° C., consisting of utilizing an alloy of Pd and Cu of an optimum composition from both a standpoint of hydrogen permeability rate and breakage leakage. The optimum alloy composition is selected in the range between about 40 to 50 weight % copper, with the balance palladium—preferably substantially of about 54 to 58 wt % Pd and 46 to 42 wt % Cu respectively. This method is, as before indicated, applicable to steam-reforming of gaseous and liquid hydrocarbons, the latter including diesel oil, as well as coal and any other fuels which may contain various amounts of sulfur.

Further modifications will occur to those skilled in this art and such are considered to fall within the spirit and scope of the present invention.

What is claimed is:

1. A method of controlling a palladium-copper alloy membrane in the generation of pure hydrogen from a fossil fuel reformate, that comprises, permeating hydrogen from the reformate through a surface of a leak-free palladium-copper alloy membrane of composition adjusted to be of substantially 54 to 58 weight percentage of palladium and 46 to 42 weight percentage of copper, respectively, and mounted with a porous-oxide support in direct contact with said membrane surface; and controlling the temperature to which the membrane is subjected during said permeation to operation in the range of from about 470° C. to about 600° C., wherein substantially constant hydrogen flux is permeated through the membrane over said temperature range and without leakage breakage.

2. A method of separating hydrogen from a gas mixture containing hydrogen in a temperature range from about 470° C. to about 600° C., that comprises, permeating the hydrogen through a leak-free palladium-copper alloy membrane of composition adjusted to be optimized both for permeability rate and resistance to leakage breakage during operation in said temperature range, and mounted with a porous-oxide support in direct contact therewith; and controlling the temperature to which the membrane is subjected while being permeated by a stable flux of pure hydrogen to confine said operation to said temperature range.

3. The method of claim of claim 2 wherein the composition optimization involves adjusting the palladium-copper alloy ratio to be of substantially 54 to 58 weight percentage of palladium and 46 to 42 weight percentage of copper, respectively.

4. The method of claim 3 wherein the gas mixture is produced in the conducting of reforming reaction in situ of membrane separation in a membrane reactor converting hydrocarbon for the recovery of hydrogen.

5. The method of claim 3 wherein pure hydrogen is permeated through the membrane from fossil fuel reformates having sulfur contamination and further wherein said alloy is resistant to sulfur contamination.

6. The method of claim 5 wherein said reformates are selected from the group consisting of those produced by steam reformation, partially oxidized diesel fuel, and partially oxidized coal.

7. In the generation of pure hydrogen from a fossil fuel reformate, a cell having a controller of temperature in the range of about 470° C. to about 570° C. and mounting therein a leak-free membrane consisting of a palladium copper alloy having a surface through which hydrogen is permeated and provided with a porous oxide-bearing support in direct contact with said surface of the membrane, the membrane having a composition adjusted to be of substantially 54 to 58 weight percentage of palladium and 46 to 42 weight percentage of copper, respectively.

8. The cell of claim 7 wherein the said support is a porous aluminum oxide-bearing fabric.

* * * * *